J. L. RANDOLPH.
VALVE SETTING MECHANISM FOR LOCOMOTIVES.
APPLICATION FILED DEC. 18, 1909.
951,258.
Patented Mar. 8, 1910.
2 SHEETS—SHEET 1.
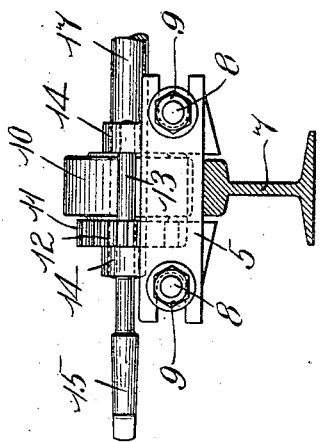
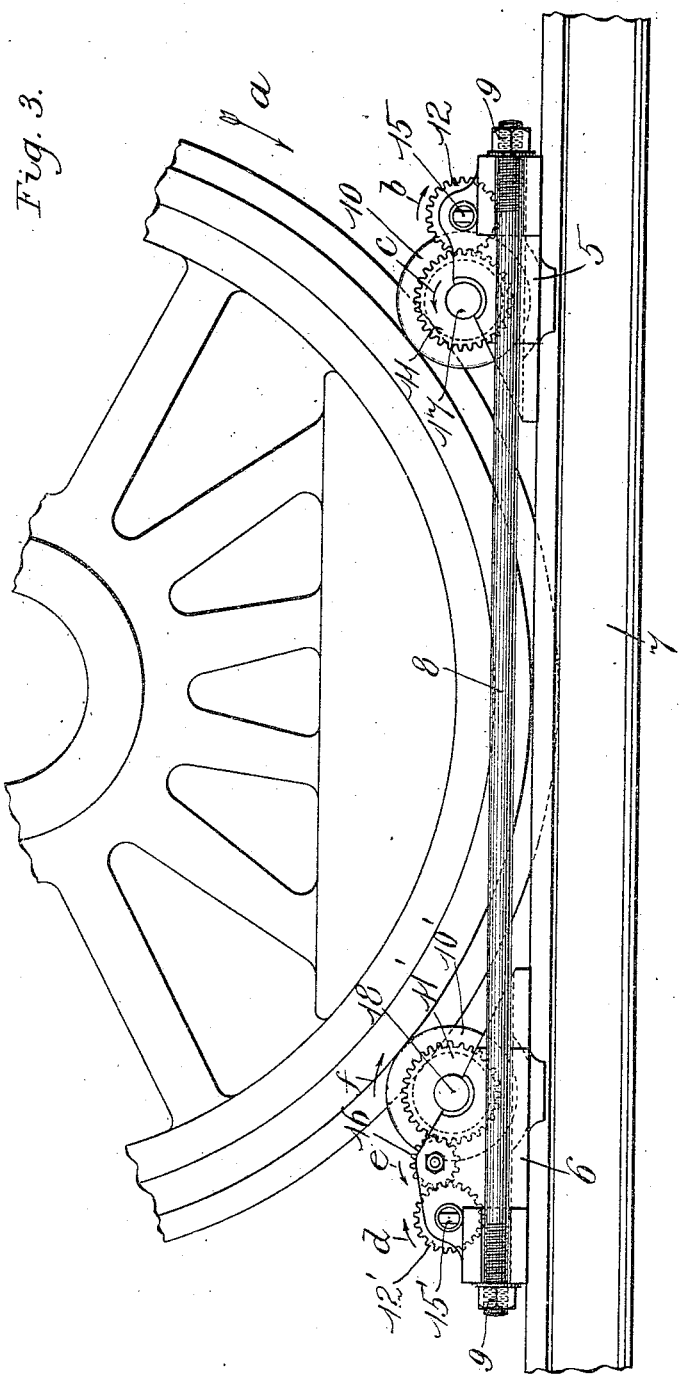

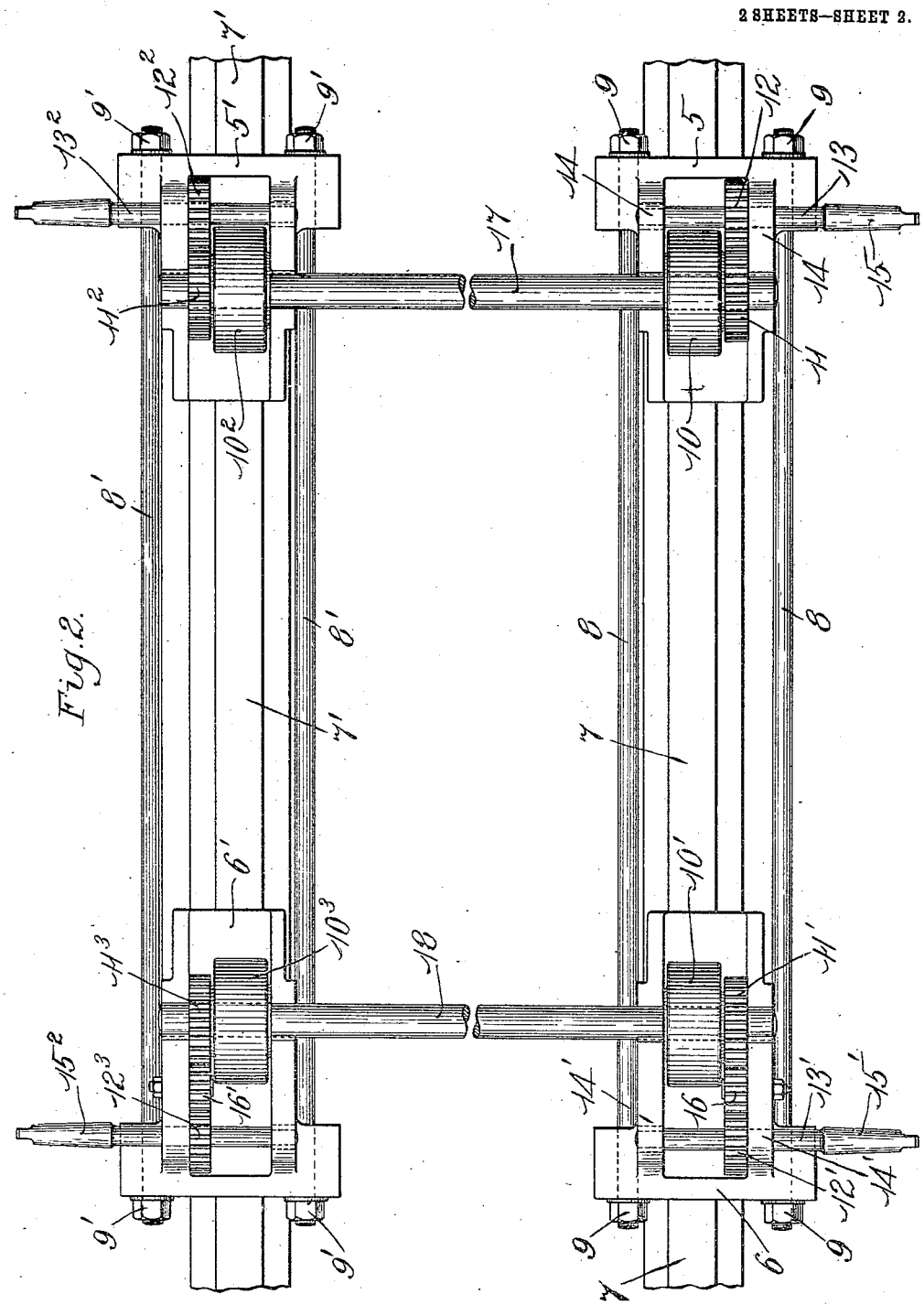

UNITED STATES PATENT OFFICE.

JOHN L. RANDOLPH, OF WOBURN, MASSACHUSETTS, ASSIGNOR TO SHERBURNE & CO., OF BOSTON, MASSACHUSETTS, A FIRM.

VALVE-SETTING MECHANISM FOR LOCOMOTIVES.

951,258. Specification of Letters Patent. Patented Mar. 8, 1910.

Application filed December 18, 1909. Serial No. 533,899.

*To all whom it may concern:*

Be it known that I, JOHN L. RANDOLPH, a citizen of the United States, residing at Woburn, in the county of Middlesex and State of Massachusetts, have invented new and useful Improvements in Valve-Setting Mechanism for Locomotives, of which the following is a specification.

This invention relates to mechanism for raising the driving wheels of a locomotive from the rails and then rotating the same in one direction or the other as may be desired and to the extent that may be desired, the object of the invention being to provide a mechanism whereby the wheels of the locomotive, having been raised from the rails, may be rotated in order to adjust the valves and eccentrics.

The invention consists in the combination and arrangement of parts set forth in the following specification and particularly pointed out in the claim thereof.

Referring to the drawings: Figure 1 is a side elevation of my invention, with a portion of one of the driving wheels of a locomotive in connection therewith. Fig. 2 is a plan view of the same. Fig. 3 is an end elevation of one of the shoes and the mechanism by means of which the driving wheel of the locomotive is rotated.

Like characters refer to like parts throughout the several views of the drawings.

In the drawings, 5 and 6 are shoes. 7 is the rail upon which said shoes are slidably mounted. 8, 8 are rods connecting said shoes together, said rods being screw-threaded to receive nuts 9, 9.

Referring to that portion of my invention at the right hand side of Fig. 1, it will be seen that the shoe 5 has journaled thereon a roll 10, and fast to this roll 10 is a gear 11 into which meshes a pinion 12. The pinion 12 is fastened to a shaft 13 having bearings at 14, 14 in the shoe 5. Said shaft 13 terminates in a tapered shank 15, which can be connected by a flexible shaft or in any other suitable and well known manner to a motor actuated either by compressed air or by electricity. The shoe 6 has journaled thereon a roll 10' to which is fastened a gear 11' which meshes into an intermediate gear 16, said intermediate gear being driven by a pinion 12' which is fastened to a shaft 13' arranged to rotate in bearings 14' in the shoe 6 and terminating in a tapered shank 15', which may be connected in any suitable manner to a motor, as hereinbefore set forth in relation to the tapered shank 15.

The roll 10 is fastened to a shaft 17 which extends across from the shoe 5 to the shoe 5' (see Fig. 2), and is fastened to a roll $10^2$ and journaled on said shoe 5'. The shoe 6' is also provided with a roll $10^3$ which is journaled to rotate thereon, said rolls $10^2$ and $10^3$ being arranged to bear against a driving wheel and the shoes 5' and 6' resting upon a rail 7'. The shoes 5' and 6' are connected together by rods 8', 8' which have nuts 9', 9' in screw-threaded engagement therewith and bearing against the opposite ends, respectively, of the shoes 5' and 6'. The roll 10' is connected to the roll $10^3$ by means of a shaft 18.

The general operation of the device hereinbefore specifically described is as follows: The shoes 5 and 6, 5' and 6' are placed upon their respective rails 7 and 7', as illustrated in Figs. 1 and 2, with the rails 10 and 10' bearing against one of the driving wheels and the rolls $10^2$ and $10^3$ bearing against another of the driving wheels. Then, by screwing up on the nuts 9, 9 and 9', 9', the rolls 10 and 10' are drawn toward each other and the rolls $10^2$ and $10^3$ are drawn toward each other by reason of the shoes 5 and 6 and 5' and 6', respectively, being drawn toward each other. Thus the driving wheels are lifted gradually from the rails 7 and 7'. When this has been accomplished the driving wheels are rotated in the following manner. If a direct acting motor is employed and it is desired to rotate the driving wheel in the direction of the arrow *a* (Fig. 1) assuming that the motor rotates in the direction of the arrow *b*, said motor will be coupled to the shaft 13, and by rotating said shaft in the direction of the arrow *b*, it will be seen that the pinion 12 will be rotated in the same direction, thus rotating the gear 11 in the direction of the arrow *c* and rotating the driving wheel in the direction of the arrow *a*. By this rotation of the roll 10, the roll $10^2$ will be rotated, through the shaft 17 which connects said roll 10 with the roll $10^2$, and thus the driving wheels may be rotated until the eccentrics and valves are set at any desired position. If it is desired to rotate the driving wheel in the direction opposite to the arrow *a* with a direct acting motor, then the said motor will be coupled to the shaft 13′, and as said shaft is rotated by said motor in the direction of the arrow $d$ the intermediate gear will be rotated in the direction of the arrow $e$ which will rotate the gear 11′ in the direction of the arrow $f$, thus rotating the roll 10′ in the same direction as the arrow $f$ and rotating the driving wheel in the opposite direction to the arrow $a$, so that it will be seen that the driving wheel can be rotated in the direction of the arrow $a$ or in a reverse direction thereto by applying a direct acting motor to the shaft 13 and to the shaft 13′. The same result can evidently be attained by applying a motor which can be reversed to the shaft 13 or to the shaft 13′ and first driving the motor in one direction and then reversing it to drive it in the opposite direction. After the valves have been set to the desired position the motor is stopped and the nuts 9, 9 manipulated to allow the shoes to be spread apart by the weight of the drivers until said drivers rest upon their respective rails.

If desired, the rotation of the driving wheel in opposite directions may be secured, with a direct-acting motor, by rotating the shaft 13, as hereinbefore described, and then to reverse the direction of rotation of the driving wheels instead of connecting the motor to the shaft 13′, the same may be connected to the shaft $13^2$ which has fastened thereto a gear $12^2$ which meshes into a gear $11^2$ fast to the shaft 17, so that a direct-acting motor applied to the shaft $13^2$ would rotate the driving wheel in the opposite direction to that in which it would be rotated by the same motor applied to the direct-acting shaft 13. The driving wheel could also be rotated in an opposite direction to that in which it is rotated by applying a direct-acting motor to the shaft 15′, by connecting the same motor to the shaft $15^2$ which has a gear $12^3$ fast thereto meshing into an intermediate gear 16′ which meshes into a gear $11^3$ fast to the shaft 18, so that by the mechanism hereinbefore described the driving wheels of the locomotive may be rotated either forwardly or backwardly from either side of the locomotive by a direct-acting motor and, of course, said driving wheels may be rotated either forwardly or backwardly by a motor which can be reversed.

Having thus described my invention, what I claim and desire by Letters Patent to secure is:

A valve setting mechanism for a locomotive having, in combination, a pair of shoes adapted to rest upon a rail, a pair of rods connecting said shoes together, nuts having screw-threaded engagement with said rods and bearing against opposite ends, respectively, of said shoes, whereby said shoes may be drawn toward each other along said rail, a roll journaled on each of said shoes adapted to bear against the periphery of one of the driving wheels of said locomotive, whereby said wheel may be raised from said rail, a gear fast to one of said rolls, a pinion journaled to rotate on one of said shoes and meshing into said gear, a gear fast to the other of said rolls, an intermediate gear meshing thereinto, a pinion gear meshing into said intermediate gear, and means to rotate said last named pinion gear, whereby said driving wheel may be rotated in opposite directions.

In testimony whereof I have hereunto set my hand in presence of two subscribing witnesses.

JOHN L. RANDOLPH.

Witnesses:
 CHARLES S. GOODING,
 SADIE V. MCCARTHY.